Oct. 22, 1968     E. M. BARKER     3,407,075
PROCESS FOR PRODUCING A LOW FAT SPREAD AND THE PRODUCT THEREOF
Filed April 13, 1964     2 Sheets-Sheet 1

INVENTOR
EARDLEY M. BARKER
BY Williamson & Palmatier
ATTORNEYS

United States Patent Office 3,407,075
Patented Oct. 22, 1968

3,407,075
PROCESS FOR PRODUCING A LOW FAT SPREAD
AND THE PRODUCT THEREOF
Eardley M. Barker, Rochester, Minn., assignor to Better Spreads, Inc., Rochester, Minn., a corporation of Minnesota
Filed Apr. 13, 1964, Ser. No. 359,395
4 Claims. (Cl. 99—123)

ABSTRACT OF THE DISCLOSURE

The production of a new and improved product containing essentially non-fat and fat components of whole milk for use as a substitute spread for butter, and further having important shortening effect and high moisture-retention properties for production of baked goods, and the combinations of process steps for production of such products. The production produces a fine emulsion of fat or oil globules in water or water solvents having substantially less fat content than that of butter or margarine.

This invention relates to the production of a unique and novel low fat product derived mainly from the constituents of whole milk, and particularly adapted for use as a table spread, and having shortening and moisture-retaining effects for baked goods.

For many years in view of the high production cost of butter, the high cholesterol content thereof, and the competitive low cost of margarine, it has been very desirable to devise and conceive new uses for milk and the ingredients thereof, and new products produced from the ingredients of whole milk for which a substantial demand and economy of manufacture could be realized.

It is an object of this invention to provide a process for production and a product produced thereby which would give to the public at economical cost, a unique product composed mainly of the components of whole milk, having a low fat content approximately half of the content of butter and margarine but having protein content, vitamins and phospholipides with attendant amino acids as high or higher than in whole milk, all novelly homogenized into unusually small, uniformly dispersed globules. This product has a fine uniform texture, excellent moisture-retaining qualities substantially superior to butter and margarine, and is particularly well adapted for table spreads, for bread, crackers, rolls and the like, as well as having shortening effect and increased moisture retention properties in baked goods such as bread and rolls.

A further object is the provision of a process of the class described which may be carried out at reduced cost without requirement of large expense for apparatus or machine capitalization and which will produce a comparatively low fat plastic milk product adapted for table spreads and shortening effect in baked goods, having substantially uniform viscosity within a wide temperature range between home refrigeration storage and 100° F., and which is readily spreadable at home refrigeration storage temperatures (40° to 45° F.), and which product at home storage temperatures has good keeping qualities. My improved product has substantially the flavor and taste of fine butter, while containing at least only half of the proportion of butterfat, and with the inclusion of the non-fat milk solids present in skim milk.

The morphology of the finished product is very different from that of butter or margarine in that the globules of the fat are much more widely dispersed in a matrix of moisture and non-fat solid ingredients and are of an average diameter approximating 2 microns as contrasted with the normally agglomerated globules of fat in butter and margarine averaging in excess of 8 microns in diameter. My new composition has greatly improved moisture-retaining characteristics as contrasted with butter, margarine and numerous known spreads which enhance the spreadability of the product and also make it of special value as for shortening effect and moisture retaining qualities for baked goods.

The foregoing and other objects of my invention (process and product) will be more apparent from the following description made in conjunction with the accompanying drawings wherein like reference characters refer to similar parts throughout the several views and in which.

Figure 10:
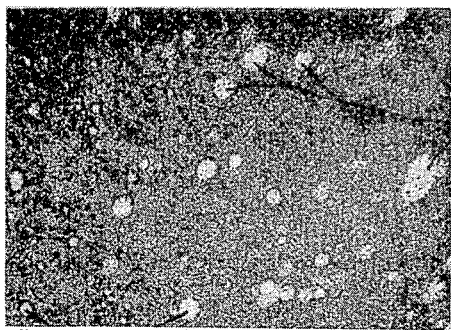
Figure 11:
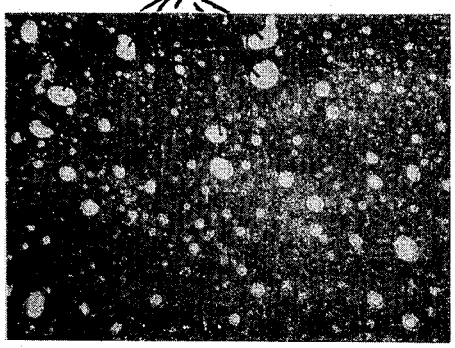
Figure 12:
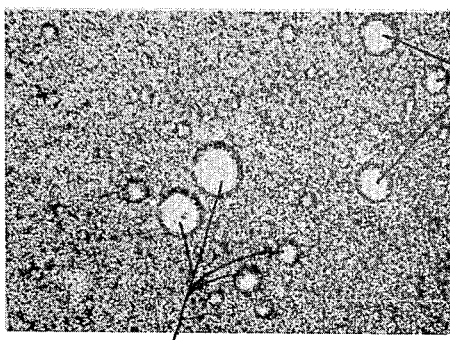
Figure 13:
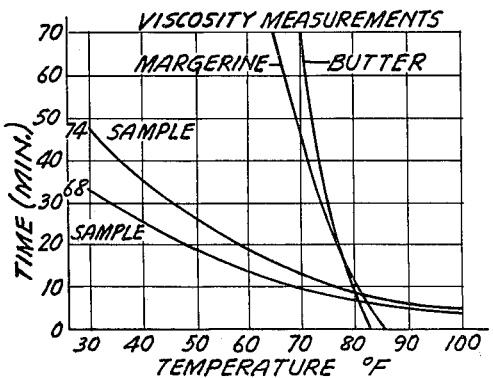

FIGS. 10 to 12 inclusive are photomicrographs at the same scale of enlargement of an alternative product of my process wherein the fat ingredients are derived from 50% butterfat and 50% corn oil, taken of slices of the produced product at the corresponding temperature 36° F., 70° F., and 92° F.; and FIG. 13 is a graph showing the relative change in viscosities with reference to time and temperatures of the four products illustrated in FIGS. 1 to 12 inclusive.

In carrying out my novel process, products varying in the percentage of butterfat (and in some instances butterfat in combination with other edible fats, for example, corn oil) may be obtained. All of such products however contain similar characteristics as to stability of a constant viscosity to the temperature ranges previously indicated, taste, water retention properties, and dispersion of very small globules of fat ingredients in a matrix of moisture and non-fat milk solids.

In general my process is carried out by first procuring the source of fats and whole milk ingredients in somewhat concentrated form. Where no other edible fats are to be employed, sweet cream having a butterfat content from 35–55° is weighed into a pasteurizing vat and heated to approximately 130° F. Where other edible fats and butterfats are to be included, the other fat containing ingredients such as corn oil, peanut oil, safflower oil, and the like, is admixed with the sweet cream according to the proportion of the two fats desired in the final product, usually varying from a 1 to 1 up to a 1 to 4 ratio of the butterfat to the other edible fat content.

Before pasteurizing, a stabilizer-emulsifier blend usually containing small additives of sorbic and food grade salt is added to the concentrate liquid containing fats.

The stabilizer-emulsifier blend and mixture is vigorously agitated as by a high speed agitator or by means of a funnel entering into a high speed rotary pump which is connected to the vat outlet and discharges back into the vat. It is important to obtain a full homogeneous admixture of the materials, particularly the stabilizer-emulsifier combination. Salt and sorbic acid are added for flavor, and to inhibit mold or yeast growth.

The stabilizer-emulsifier may include water binding agents such as various vegetable gums, locust bean, guar, carboxymethylcellulose, Irish moss extractives and the like used in proportion and also preferably includes emulsifiers such as mono and diglycerides with binding agents and emulsifiers used in proper ratio with the water binding agents. It is understood that other equivalent emulsifiers may be used in place of the glycerides. A percentage content of stabilizer-emulsifier of the finished product in the neighborhood of 0.385% with the salt and sorbic acid balance of the blend in the neighborhood of 1.35% has been found highly satisfactory to produce my desired results.

After thoroughly admixing the above which often requires, with efficient agitators, up to ten minutes time, a concentrated skim milk in liquid or dry powder form is added to an extent whereupon the basis of the finished product considering moisture and allowing for the small amount of non-fat milk solids in the original sweet cream of about 11% by weight of the finished product will be in the form of non-fat milk solids. Color in the product is usually desirable and we prefer at this point and before effective heating of the mixture to add annatto color to the desired shade.

The next step in the process is to heat the said mixture to a temperature-time relationship equivalent to 165° F., for approximately thirty minutes. Lactic acid (for example a concentrate of 80° at the rate of 20 cc. to 12 pounds of the finished product) is added to lower the pH within a range of about 4.7 to 6.0. The presence of lactic acid inhibits development of mold and other micro organisms and helps develop coalescence of the fat in the subsequent homogenization steps, promotes and develops a congeal or jell structure upon cooling.

The said heated mixture is cooled to a temperature range between 130° to 150° F., and then a flavoring ingredient may be added such as a standard "starter" distillate. Cooling continues until the temperature is lowered within a range of between 130°–140° F.

The mixture at said temperature is then subjected to intense and unusual homogenization preferably in successive stages. The second stage valve is first adjusted to 500–700 pounds p.s.i. following which the first stage is adjusted within a range from 2000–3200 pounds p.s.i. The entire mixture is then doubled homogenized; that is, passed through a second machine at the above p.s.i. or directly after the first machine or the mixture run into a tank and then completely run through the same machine a second time. This does not preclude the utilization of other types of homogenizers.

After such intense homogenization the product is cooled to approximately 40° F., in any suitable manner. In this connection the products may be poured into suitable containers and the filled containers placed in refrigeration which will assure such cooling to 40° F.

Figure 1:
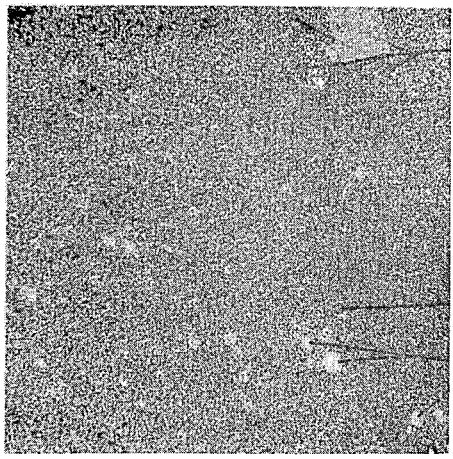
FIG. 1 is a photomicrograph enlarged at 100 times, of a sectional cut of my improved product produced as recited herein as Example 1, the substance immediately prior to the cut being at a temperature of 36° F.

The products produced from my novel and improved process have unique and highly beneficial properties and characteristics as contrasted with butter, margarine and heretofore used table spreads, and some of which will be apparent from an inspection of the following photomicrographs constituting FIGS. 1–12 inclusive of the accompanying drawings. The texture of my products is fine, smooth and uniform. As shown in FIG. 1 and for that matter, FIGS. 2 and 3 of the drawings, my product where the entire source of fat is from sweet cream shows a thorough dispersion of very small fat or oil globules, some of which are indicated as F on the drawings and are contained in a matrix constituting a continuous water phase with great numbers of non-fat milk solid particles dispersed therein.

It has been authentically established that fat in the form of and in use as butter or margarine has a high degree of hydrophobic or water repelling tendencies.

On the other hand many of the phospholipide groups have relatively high hydrophilic or water absorbing and water retaining capacities.

The natural phospholipides in milk are for the most part eliminated in the churning process of making butter. Consequently butter has very poor hydrophilic capacity.

Figure 5:
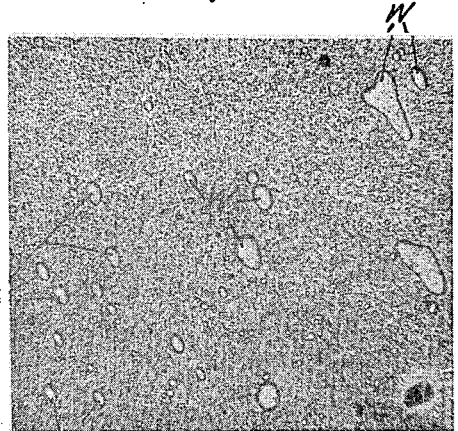
FIG. 5 is a similar photomicrograph of the same butter at 70° F.
Figure 6:
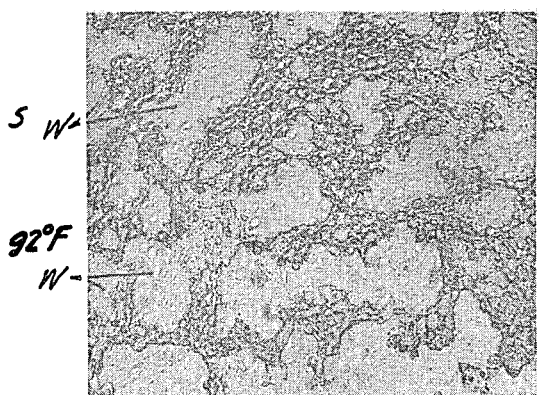
FIG. 6 is a photomicrograph of a slice of butter at 92° F.

As my novel dairy product constitutes an exceptionally stable emulsion of intensely homogenized fat and contains a significant proportion of phospholipide substances and finely divided milk solids, it has high hydrophilic capacity. The photomicrographs of the subject material comprising FIGS. 1 to 3 of the drawings, taken at temperatures of 36°, 70° and 92° F., respectively show the high degree of integration and water retention capacities of this new product resulting from the carrying out of my novel process. This integration, water retention and uniform dispersion of minute fat globules is in sharp contrast with the integration or lack of integration and water retention of conventional butter, photomicrographs of which are shown in FIGS. 4, 5 and 6 side by side of FIGS. 1 to 3 at the previously recited similar temperatures.

Commenting now in detail on the photomicrographs, FIGS. 1 to 3 inclusive, showing enlargement at 100 times of the morphology of my novel product where source of fat is entirely butterfat from sweet cream, I would point out as follows:

FIG. 1 showing a slice of my novel product at a temperature of 36° F., discloses a substantially uniform dispersion of minute oil or fat globules interpersed with the minute, irregular shaped particles constituting natural milk solids (non-fat), all contained in a continuous water phase or matrix. The average diameters of the minute fat globules are 2 microns or less, while a few of the enlarged fat globules appearing in FIG. 1 are indicated by the letter F with appropriate lead lines. A few enlarged solid particles, probably agglomerates, are shown in darker tone as indicated at S.

Figure 4:
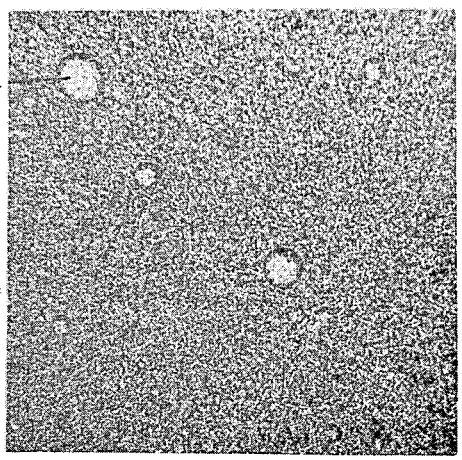
FIG. 4 is a photomicrograph of standard butter sliced, and at a temperature of 36° F.

Contrasting the morphology of my improved product with the photomicrograph FIG. 4 taken at the same scale of magnification (100 times) and at the same temperature (36° F.), it will be seen that in FIG. 4 (standard butter) the individual globules of fat or oil are substantially larger with less uniform dispersion thereof than in my novel product. By test, the fat globules of the butter average larger than 8 microns. Milk solids (non-fats) are substantially absent and the large light tinted globules indicated by W represent globules of water which exude and are not a part of any continuous matrix or phase.

Figure 2:
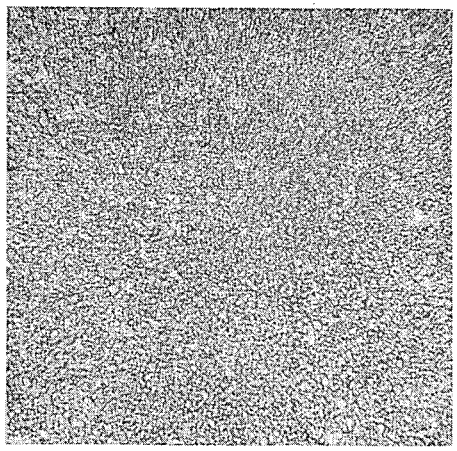
FIG. 2 is a similar photomicrograph of the same product at a temperature of 70° F.

Comparing the morphology of the substances shown in FIGS. 2 and 5, both photomicrographs being taken at the same magnification (100 times) and with products at the same temperature (70° F.), the slice of my novel product in FIG. 2 shows remarkable uniformity of dispersion of the minute fat globules, even more uniform than in FIG. 1, with a continuous matrix in the form of a water phase and without any appreciable exuding of water droplets. The butter slice shown in FIG. 5 definitely indicates that at the 70° temperature integration is beginning to disappear and many relatively large light tinted masses represent exuding masses of water.

Figure 3:
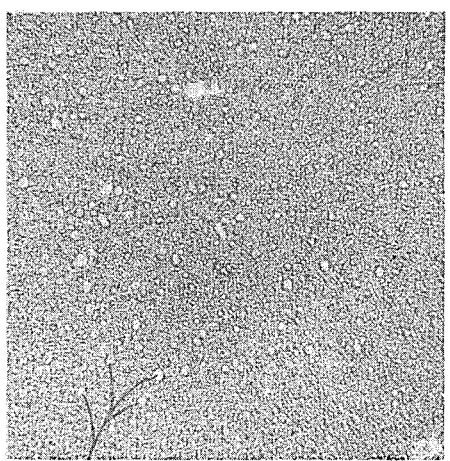
FIG. 3 is a similar photomicrograph of the same product at 92° F.

Comparing now the morphology of the products shown in FIGS. 3 and 6 at a temperature of 92° F., it will still be seen that at such high temperature the distribution of relatively small, widely dispersed fat or oil globules of my novel process is still present with a high degree of integration and water retention capacity (FIG. 3). The globules of fat, with the irregularly shaped darker particles of milk solids (not-fat), are all contained still in a continuous water phase or matrix. The morphology of the butter at 92° F. (FIG. 6) shows a nearly complete breakdown of the viscosity of the product, the darker substance areas showing contour being oil from breakdown of fat globules while many of the globular substances delineated by lighter lines show exuded water as indicated by W on FIG. 6.

In FIGS. 10 to 12, photomicrographs of an alternative novel product produced through the practice of my process and taken at the previously used magnification (100 times) and at temperatures of 36°, 70° and 92° F. respectively again shown substantially uniform fine dispersion of the minute fat or oil globules with the minute darker milk solid particles of more irregular shape, all contained in a continuous water phase or matrix. In FIG. 10 a slice at 36°, a number of large light colored globules of fat are shown, as indicated at F having minute solids on the oil surface thereof. Comparing the morphology of FIG. 10 with that of a slice of margarine (FIG. 7) taken at the same temperature, 36° F., it will be noted that the individual small globules of the margins are noticeably larger than the minute globules of my second product and that exuding water or moisture is present as indicated by W, in several sharply and shadowy delinated areas.

Figure 8:
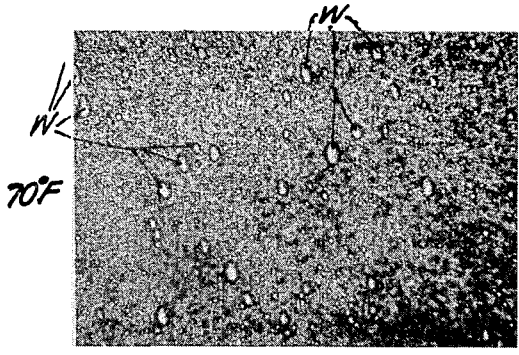
FIG. 8 is a similar photomicrograph of a slice of the same margarine at a temperature of 70° F.

Referring now to the morphology of FIG. 11, my alternative product with milk solids and fat ingredients partly butterfat and partly corn oil, it will be seen that the aforesaid general pattern of dispersion of the fine fat globules is present with a somewhat larger number of large fat globules indicated as F appearing. In contrast thereto, the morphology of the margarine shown at the temperature of 70° F. in FIG. 8 shows a break-up of the continuity of larger fat globules, with the presence of a large number of droplets of exuding water W, delineated by the deep shadowed lines.

Further comparison of my alternate product (FIG. 12) with ordinary margarine (FIG. 9) at the same temperature, 92° F., shows still a quite uniform dispersion of the great multiplicity of fine fat particles with irregularly shaped darker milk solids, all in a continuous water phase or matrix. The large circular globules constitute fat F with small particles adhered or contained therein. In contrast the morphology of the margarine at 92° (FIG. 9) shows a breakdown of the matrix with large lightly defined areas of water W and with remnants of agglomerated fat globules being widely spaced apart, showing that the viscosity of the margarine at a temperature of 92° F. has become negligible.

Careful professional tests of viscosity of the products illustrated in FIGS. 1 through 12 of the drawings were made at the three prevalent temperatures previously referred to, to wit, 36°, 70° and 92° F. The apparatus used in such tests for measurements consisted of a ⅜-inch steel ball attached to an aluminum bar which pivoted downward on low friction bearings. By means of a pointer and scale the distance of fall was exactly reproduced. Because of the extreme viscosity of butter and margarine below 70° F., it was impossible to obtain any valid results below such temperature. Both butter and margarine were essentially solids at 65° F. Above 85° F., both samples of butter and margarine became semi-liquid, giving fractions of a second (1/10 or less) for the full fall time of 12 mm. On the other hand the samples identified as 68 and 74, morphology of which is shown respectively in FIGS. 1 to 3 and FIGS. 10 to 12 of the drawings, changed very little in viscosity over the range from 30° to 100° F. A graph was plotted from the scientifically determined viscosity tests which constitutes FIG. 13 of the drawings, and which shows very little change in viscosity of sample 68 (my novel product illustrated in FIGS. 1 to 3 photomicrographs) in the drop-time tests, and only slight change in the case of sample 74 shown in photomicrographs of FIGS. 10 to 12. In contrast however, are the almost vertically extending lines of the graph of the margarine and butter.

EXAMPLE 1 (SAMPLE 68)

Sample No. 68, a 500 pound batch of my table spread product produced semi-commercially. Ingredients used:

Sweet cream containing 40.30% butterfat, 5.40% milk solids (non-fat) with small addition of fresh butter ___pounds__ 448.50
Milk solids (non-fat) added in form of skim milk powder ___do____ 34.00
Butter salt at the rate of 1.25% of total weight ___do____ 6.25
Stabilizer in the form of moss extractives 0.035% ___do____ 0.175
Stabilizer in the form of cellulose gum 0.125% ___do____ 0.625
Emulsifier in the form of mono & diglycerides 0.225% ___do____ 1.125
Color in the form of vegetable or annatto ___cc___ 200
Sorbic acid at the rate of 0.10% as preservative ___pounds___ 0.50
Concentrate of 80% lactic acid to lower pH & promote gel ___cc___ 1000
Distilled starter flavor ___cc___ 750
Water to further standardize product __pounds__ 5.25

As a result of the above run ultilizing my process as previously disclosed herein, the pH of the product was 5.4; total fat content 40.87% and total solids 54.32%.

EXAMPLE 2 (SAMPLE 74)

Sample No. 74, a semi-commercially run batch where fat ingredients of an equal mount of butterfat with corn oil was produced in accordance with the previously disclosed steps of my novel process. Ingredients used:

40.00% sweet cream, and having 5.40% milk solids non-fat ___pounds__ 250
Corn oil ___do____ 100
Non-fat powder—powdered skim milk or equivalent liquid concentrated skim milk ___do____ 43
Stabilizer salt mixture as in previous Example 1 ___do____ 7.50
Lactic acid at 80% concentrate ___ounces__ 36
Starter distillate for flavor ___do____ 27
Sorbic acid ___do____ 8
Color annatto ___cc__ 160

The analysis of the product produced through the practice of my novel method as herein disclosed, showed a total fat content of 41.10%, a pH of 5.5 and a total solids content of 55.17%.

Figure 7:
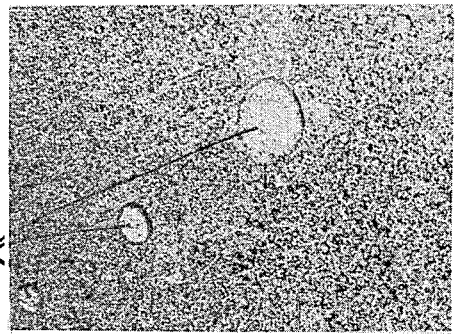
FIG. 7 is a photomicrograph of a conventional type of margarine made from corn oil, sliced at a temperature of 36° F.
Figure 9:
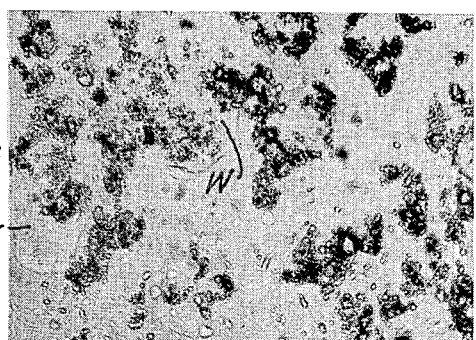
FIG. 9 is a similar photomicrograph of a slice of the same margarine at a temperature of 92° F.

Slices of this produce known as Sample No. 74 were utilized at the three temperatures indicated, and the morphology at each temperature is illustrated in FIGS. 7 to 9 inclusive in the drawings.

*Baking tests for shortening effect and moisture retention*

*Danish rolls.*—The excellent shortening effect and the improved moisture retaining effects of my novel product are well proven by the following baking tests and successive day analyses conducted for me by a commercial laboratory specializing in chemical analysis of flour, fats and oils. One of the series of said tests was made on the baking of Danish rolls (no icing) where from a batch of dough prepared for baking, four 9 pound masses were taken.

Sample A: to one of said 9 pound pieces 2 pounds of my improved produce made in accordance with Example 1 disclosed herein (containing as fat ingredient only butterfat from sweet cream) was blended into the dough in the usual manner and the produce baked into said Danish rolls.

Sample B: to another of said 9 pound pieces of prepared dough, 2 pounds of my novel product of the composition described in Example 2 disclosed herein (containing equal parts of butterfat and margarine) was blended into the dough and baked into Danish rolls.

Sample C: to another 9 pound piece of prepared dough, 2 pounds of butter was blended into the dough and then baked into Danish rolls.

Sample D: to the fourth 9 pound piece of prepared dough, 2 pounds of corn oil margarine was blended into the dough and then baked into Danish rolls.

The said four batches of rolls were baked at the same time and stored at room temperature under the same humidity conditions. Thereafter analyses of the four batches of rolls were made as indicated on the following table.

SAMPLES

| Percentage of Moisture Content | A | B | C | D |
|---|---|---|---|---|
| 24 hours after baking | 27.70 | 27.3 | 21.6 | 21.8 |
| 48 hours after baking | 26.4 | 26.6 | 20.1 | 21.1 |

Complete chemical analyses of Samples A and D were made 24 hours after baking of the said Danish rolls and showed the following:

|  | Sample A, percent | Sample D, percent |
|---|---|---|
| Protein | 9.30 | 8.20 |
| Fat (Maj.) | 17.70 | 28.20 |
| Fiber | 0.20 | 0.20 |
| Nitrogen (free extract) | 43.60 | 40.30 |
| Moisture | 27.70 | 21.80 |
| Ash | 1.50 | 1.30 |
| Carbohydrates (N.F.E. plus Fiber) | 43.80 | 40.50 |

Another special moisture test was made for Danish rolls where the respective products, after baking, were deep frozen and then thawed and subjected to respective analysis 80 hours after baking. The three samples, all made from the same dough had blended therein equal amounts of:

(1) My improved product of the production enumerated in Example 1;
(2) Margarine (corn oil); and
(3) Butter.

80 hours after freezing baked rolls made from each of said samples, the products were thawed and analyzed for moisture content resulting in:

Sample (1)—22.20% moisture;
Sample (2)—18.1% moisture; and
Sample (3)—17.5% moisture.

*Sweet rolls.*—From a batch of dough prepared for the baking of sweet rolls three masses of 9 pounds each were taken. To one of said masses 2 pounds of my improved product (Example 1) with only butter as the fat ingredient, was blended or mixed therein in the usual manner, hereafter referred to as Sample E.

To the second 9 pound mass, 2 pounds of margarine was blended therein, hereafter referred to as Sample F; and To the third 9 pound mass, 2 pounds of butter was blended therein, hereafter referred to as Sample G.

The said prepared samples E, F and G were each divided into roll formation and the three batches of rolls were simultaneously baked at similar oven and temperature conditions and after baking were stored at room temperature under the same humidity and temperature conditions. Thereafter, analyses of the three batches of rolls were made as indicated on the following table:

SAMPLES

| Percentage of Moisture Content | E | F | G |
|---|---|---|---|
| 24 hours after baking | 27.1 | 22.1 | 22.0 |
| 48 hours after baking | 26.7 | 20.2 | 20.3 |
| 72 hours after baking | 25.7 | 19.1 | 18.8 |

*Bread tests.*—Two batches of prepared and kneaded dough for high protein wheat bread were made. The composition of both batches and proportions of the constituents were identical with the exception of the material blended therein for shortening effect. The first batch or sample contained 2% by weight of the novel product of my Example 1 herein. The second batch contained 2% of margarine made from soy bean oil. Loaves of bread from each were prepared and baked under similar baking conditions. The bread was stored at room temperature in similar conditions of temperature and moisture. After 24 hours of storage, analysis for moisture content was made and the bread, with my improved product contained therein (for shortening effect and moisture retention), showed a moisture content of 37.8%. The moisture content of the second batch of bread loaves wherein margarine was used as shortening, showed a moisture content of 35.2%.

Similar baking tests were made from a common dough prepared for French bread. Equal masses from this dough were taken with one containing a predetermined weight of my novel product as disclosed in Example 1. The other contained the same amount of margarine as shortening. The two said doughs were then formed into loaves and baked under the identical conditions of oven temperature. The baked loaves of the two batches were stored at room temperature in similar conditions of humidity and temperature and where subsequently analyzed for moisture content at the intervals below stated, yielding the results as shown:

After 48 hours of storage the moisture content of the bread containing my novel product was 29.1% whereas the moisture content of the second batch (with margarine) was 26.2%. Tests were repeated on other loaves of the two batches after a 96 hour storage period and for the loaves containing my improved product, showed a 28% moisture with the loaf containing margarine showing a moisture content of 25%.

It is submitted that the highly favorable and improved results as evidenced by the foregoing baking tests are due to the following new chemical and physical characteristics of my improved product as contrasted with butter and margarine used for shortening purposes:

(1) The uniform dispersion in my improved product of very small globules of the fat with little change in viscosity of the product at wide range of temperatures enables my product to be blended in a more homogeneous manner in dough and in batters than butter or margarine;

(2) The relatively high hydrophilic properties of my product because of the presence of phospholipides and finely divided milk solids, substantially improves integration of the product in a continuous water phase or matrix with retention of moisture for a substantially longer time after baking and storage than in the case of butter or margarine; and (3) Because of the dispersion of relatively small globules of fat or oils through carrying out the steps of my process, as contrasted with dispersion of relatively large fat globules (averaging over 8 microns in diameter) in butter and margarine, much greater surface areas of oil globules and solid particles are present which is conductive to integration of the mass and maintenance of substantially constant viscosity.

For the same reasons as a table spread my product has a finer texture and an ability to be easily and smoothly spread over crackers, bread, toast and the like at even home refrigeration temperatures as low as 40° F. On the other hand my product as contrasted with butter, margarine and other commonly used table spreads will not quickly melt and lose its viscosity up to temperatures of 100° F. and above.

From the foregoing description it will be seen that I have provided, within a somewhat wide range, a new food product particularly adapted for use as a table spread and also for shortening effect and increased moisture retention for baked dough products.

I have further provided a relatively simple but highly efficient process consisting in a new combination of essential steps for producing my novel product.

It will of course be understood that in the processing of my food product I am in no way limited in an alternative product to the particular proportions (substantially 1 to 1) between butterfat obtained from sweet cream and margarine or other edible oil employed, but these ratios may be varied, all within the scope of my invention within the limits and ranges heretofore set forth.

What is claimed is:

1. The process of producing a product adapted for use as a spread and having shortening effects and high moisture retention properties for production of baked goods, while having a fat content substantially less than that of butter or margarine and readily spreadable at home refrigeration temperatures and having a substantially constant viscosity through a range of temperatures between 35° and 100° F., which consists in supplying material containing in all from 30% to 49% by weight of edible fat in comparison with the weight of the finished product and at least one fourth of which is butterfat, adding to said fat containing material a blend of stabilizer-emulsifier ingredients within a range of from .15% to .5% by weight of the finished product and vigorously agitating the mixture to obtain a homogeneous mixture of the materials, adding to said admixture concentrated milk solids other than fat in liquid or dry powder form on the basis of constituting thereby from 10 to 16% by weight of the finished product, heating and holding the mixture to a temperature-time relationship equivalent to 165° F., for a period of about thirty minutes and adding a lactic acid thereto to an extent to produce a pH value of the mixture between 4.7 and 6, cooling the mixture to a temperature between 130° and 140° F. and then subjecting the mixture to an intensive homogenization.

2. The process of producing a product obtained essentially from whole milk, which product has a fat content substantially less than that of butter or margarine, is readily spreadable at home refrigeration temperatures and which has a viscosity substantially constant throughout a range of temperatures between 35° and 100° F., with good keeping qualities at home refrigeration temperatures, which consists in adding to edible milk material containing from 35% to 55% butterfat a blend of stabilizer-emulsifier ingredients within a range of from .15% to .5% by weight of the finished product with table salt and a small amount of edible preservative acid, with vigorous agitation of said substance and blend to obtain a full and homogeneous mixture of the material, said edible material constituting by weight from 60% to 90% of the finished product, adding to said admixture milk solids other than fat in liquid or dry powder form on the basis of constituting about 11% by volume of the finished product when taking into consideration the percentage of milk solids other than fat contained in the original fat containing material, heating and holding the mixture to a temperature-time relationship equivalent to 165° F., for a period of about thirty minutes and then adding a lactic acid thereto produce a pH value of the mixture between 4.7 and 6, cooling the mixture to a temperature between 130° and 140° F., and then subjecting said mixture to homogenization at total pressure ranges between 2500 and 4000 pounds p.s.i.

3. A new product derived mainly from the components of whole milk and adapted for use as a spread and having a shortening effect and high moisture retention properties for production of baked goods, readily spreadable at home refrigeration temperatures and which has a viscosity substantially constant throughout a range of temperatures between 35° and 100° F., with good keeping qualities at home refrigeration temperatures, which comprises a novel emulsion of butterfat particles consisting in an oil in water emulsion, by far the greater part of which are of a diameter of 2 microns or less, said product containing butterfat by weight within a range of from 30% to 60%, protein derived from non-fat milk solids in a percentage of from 8% to 11% by weight, and retaining moisture in a range of from 31% to 42% by weight, and being further characterized by a content of stabilizer-emulsifier ingredients within a range of from .15% to .5% by weight.

4. The process of producing a product obtained mainly from the constituents of whole milk, which product has a fat content substantially less than that of butter or margarine and is adapted for a table spread while having shortening effects, and water retention characteristics which consists in preparing a mixture of a sweet cream containing at least 40% by weight of butterfat with a lesser amount by weight of an edible oil, adding to said fatty mixture a blend of stabilizer-emulsifier ingredients in an amount to constitute by weight from .15% to .5% of the finished product and vigorously agitating the mixture to obtain a homogeneous mixture of said materials, adding to said homogeneous mixture concentrated skim milk in liquid or dry powder form on the basis of constituting thereby preferably from 9 to 13% by weight of the finished product, heating and holding the mixture to a predetermined temperature-time relationship and adding at said temperature, lactic acid to an extent to produce a pH value of the mixture between 4.7 and 6, then cooling the mixture to a temperature between 130° and 140° F., and subjecting the mixture at said temperature to intensive homogenization.

References Cited

UNITED STATES PATENTS

| | | | |
|---|---|---|---|
| 2,617,730 | 11/1952 | Long et al. | 99—123 X |
| 2,878,126 | 3/1959 | Roberts | 99—117 |
| 3,314,798 | 4/1967 | Graves | 99—123 |

FOREIGN PATENTS

| | | |
|---|---|---|
| 574,389 | 1/1946 | Great Britain. |

OTHER REFERENCES

Norman, G. H., et al., "Milk Products Journal," vol. 48, No. 12, December 1957, p. 55.

Grill, H., et al., "Journal of Dairy Science," vol. 45, May 1962, p. 656.

McDowall, F. H., "Butter Maker's Manual," vol. 2, pp. 1127 to 1129, 1953, New Zealand University Press, Wellington, New Zealand.

MAURICE W. GREENSTEIN, *Primary Examiner.*